United States Patent
Soini et al.

(10) Patent No.: US 7,027,834 B2
(45) Date of Patent: Apr. 11, 2006

(54) MOBILE TELEPHONE FEATURING ACCELERATED AMBIENT TEMPERATURE MEASUREMENT MODULE

(75) Inventors: Sakari Soini, Somero (FI); Mika Simonen, Salo (FI); Teemu Tammi, Paimio (FI)

(73) Assignee: Nokia Corporation, Espoo (FI)

(*) Notice: Subject to any disclaimer, the term of this patent is extended or adjusted under 35 U.S.C. 154(b) by 542 days.

(21) Appl. No.: 10/091,181

(22) Filed: Mar. 5, 2002

(65) Prior Publication Data

US 2003/0064749 A1  Apr. 3, 2003

Related U.S. Application Data

(60) Provisional application No. 60/326,790, filed on Oct. 2, 2001.

(51) Int. Cl.
H04M 1/00 (2006.01)

(52) U.S. Cl. ............ 455/556.1; 455/66.1; 340/501

(58) Field of Classification Search ........... 455/556, 455/403, 416, 90.1, 90.3, 95, 556.1, 66.1; 374/163, 170; 236/44 C, 46 C, 48 C, 78 B; 340/501

See application file for complete search history.

(56) References Cited

U.S. PATENT DOCUMENTS

| | | | |
|---|---|---|---|
| 4,370,070 A * | 1/1983 | Leroux | 374/170 |
| 5,148,002 A * | 9/1992 | Kuo et al. | 219/211 |
| 5,504,415 A * | 4/1996 | Podrazhansky et al. | 320/118 |
| 5,521,793 A * | 5/1996 | Dalgleish et al. | 361/752 |
| 5,603,101 A * | 2/1997 | Choi | 455/566 |
| 5,946,641 A * | 8/1999 | Morys | 702/91 |
| 6,000,845 A * | 12/1999 | Tymkewicz et al. | 374/155 |
| 6,513,723 B1 * | 2/2003 | Mueller et al. | 236/46 R |
| 6,697,645 B1 * | 2/2004 | MacFarlane | 455/566 |
| 6,718,164 B1 * | 4/2004 | Korneluk et al. | 455/115.1 |
| 6,748,195 B1 * | 6/2004 | Phillips | 455/41.2 |
| 6,754,504 B1 * | 6/2004 | Reed | 455/517 |
| 6,788,928 B1 * | 9/2004 | Kohinata et al. | 455/411 |

FOREIGN PATENT DOCUMENTS

| | | |
|---|---|---|
| DE | 298 06 392 U 1 | 7/1998 |
| DE | 299 21 515 U 1 | 2/2000 |
| EP | 0 245 838 A | 11/1987 |
| JP | 59 203931 A | 11/1984 |
| JP | 2001 223791 A | 8/2001 |

OTHER PUBLICATIONS

Patent Abstract of China, Chinese Patent Application No. 1,296,353.
Patent Abstract of Japan, Publication No. 2001 223791, K. Fumimasa, "Radio Communication Device", Aug. 17, 2001.
Patent Abstract of Japan, Publication No. 59 203931 A, A. Keiichi, "Correcting Method of Fluid Thermometer", Nov. 19, 1984.

* cited by examiner

Primary Examiner—CongVan Tran

(57) ABSTRACT

A mobile phone has various components, including a housing and a battery, and an accelerated ambient temperature measurement module for measuring the ambient temperature of the environment surrounding the user equipment based on the temperature of at least one point in the mobile phone. The at least one point may include one or more points in relation to one or more of the various components. The accelerated ambient temperature measurement module measures the accelerated ambient temperature based on the temperature of the housing or the battery. The mobile phone has a resistor arranged in relation to either the housing or battery, and the accelerated ambient temperature measurement module determines the accelerated ambient temperature based on certain equations.

34 Claims, 5 Drawing Sheets

MOBILE TELEPHONE FEATURING ACCELERATED AMBIENT TEMPERATURE MEASUREMENT MODULE

This application claims the benefit of U.S. Provisional Application No. 60/326,790, filed Oct. 2, 2001, which is hereby incorporated by reference in its entirety.

BACKGROUND OF THE INVENTION

1. Field of Invention

The present invention relates to user equipment, such as a mobile phone or a laptop; and more particularly to a method and apparatus for measuring the ambient temperature of the environment surrounding the user equipment.

2. Description of Related Art

Active and sports-oriented people many times need, or would like, to know what the ambient temperature is. Unfortunately, most people do not carry around a thermometer to determine the same.

According to an understanding of an English-language translation of an abstract, Chinese application no. 12 96 353 appears to disclose a mobile telephone, cordless telephone or general phone that automatically-measures and displays the temperature thereof. As soon as the mobile telephone is started or the general telephone is called up, the temperature display can be started to detect temperature, after seconds the liquid crystal display can automatically display ambient temperature. It is not clear from the English-language translation of the abstract how the temperature is determined.

The inventors are not aware of any other mobile phone having a thermometer for measuring the ambient temperature of the environment surrounding the mobile phone.

SUMMARY OF INVENTION

In its broadest sense, the present invention features a new and unique method and apparatus for measuring an ambient temperature of the environment surrounding user equipment, such as a mobile phone, based on the temperature of at least one point in the user equipment. The at least one point may include one or more points in relation to one or more components of the user equipment.

In particular, the mobile phone has an accelerated ambient temperature measurement module that measures the ambient temperature based on the temperature of, for example, either the mobile phone's housing (also known as cover) or battery, a combination thereof, or some other mobile phone component. The mobile phone may have a resistor arranged in relation to either the mobile phone's housing or battery. The resistance of the resistor depends on temperature of the mobile phone component. The accelerated ambient temperature measurement module determines the ambient temperature based on one or more sets of equations.

Besides the temperature measurement, the accelerated ambient temperature measurement module may also determine the wind chill, i.e. the cooling effect of air flow and air flow velocity, based on the temperature of this very same mobile phone component.

The mobile phone may also have a display for showing the accelerated ambient temperature measurement in Celsius or Fahrenheit degrees, and/or an audio module for generating an audio signal containing the accelerated ambient temperature measurement. The display may have a menu with a menu selection for displaying the accelerated ambient temperature measurement.

The accelerated ambient temperature measurement module may have a temperature conversion module for converting the accelerated ambient temperature measurement either from Celsius to Fahrenheit degrees or from Fahrenheit to Celsius degrees, and a rounding module for rounding the accelerated ambient temperature measurement to a nearest whole number.

In effect, the mobile phone contains a thermometer that enables the user to see the current temperature via the mobile phone's menu. The thermometer may show the current temperature in either Celsius or Fahrenheit. The current temperature is calculated from the temperature of the housing or battery by a mathematical model. The mathematical model accelerates the thermometer to show the right ambient temperature when the mobile phone is warmer than ambient air.

The phone temperature is typically higher than ambient air temperature after a call or when it has been in the user's pocket. To view the correct ambient temperature, the mobile phone would have to be in a stable condition for about an hour. For a typical user, an hour would be much too long time to wait for the right ambient temperature. With the accelerating formula of the present invention, the thermometer shows the right ambient temperature much earlier, in less than half of the time.

BRIEF DESCRIPTION OF THE DRAWING

The drawing, not drawn to scale, includes the following Figures.

DETAILED DESCRIPTION OF INVENTION

Figure 1:
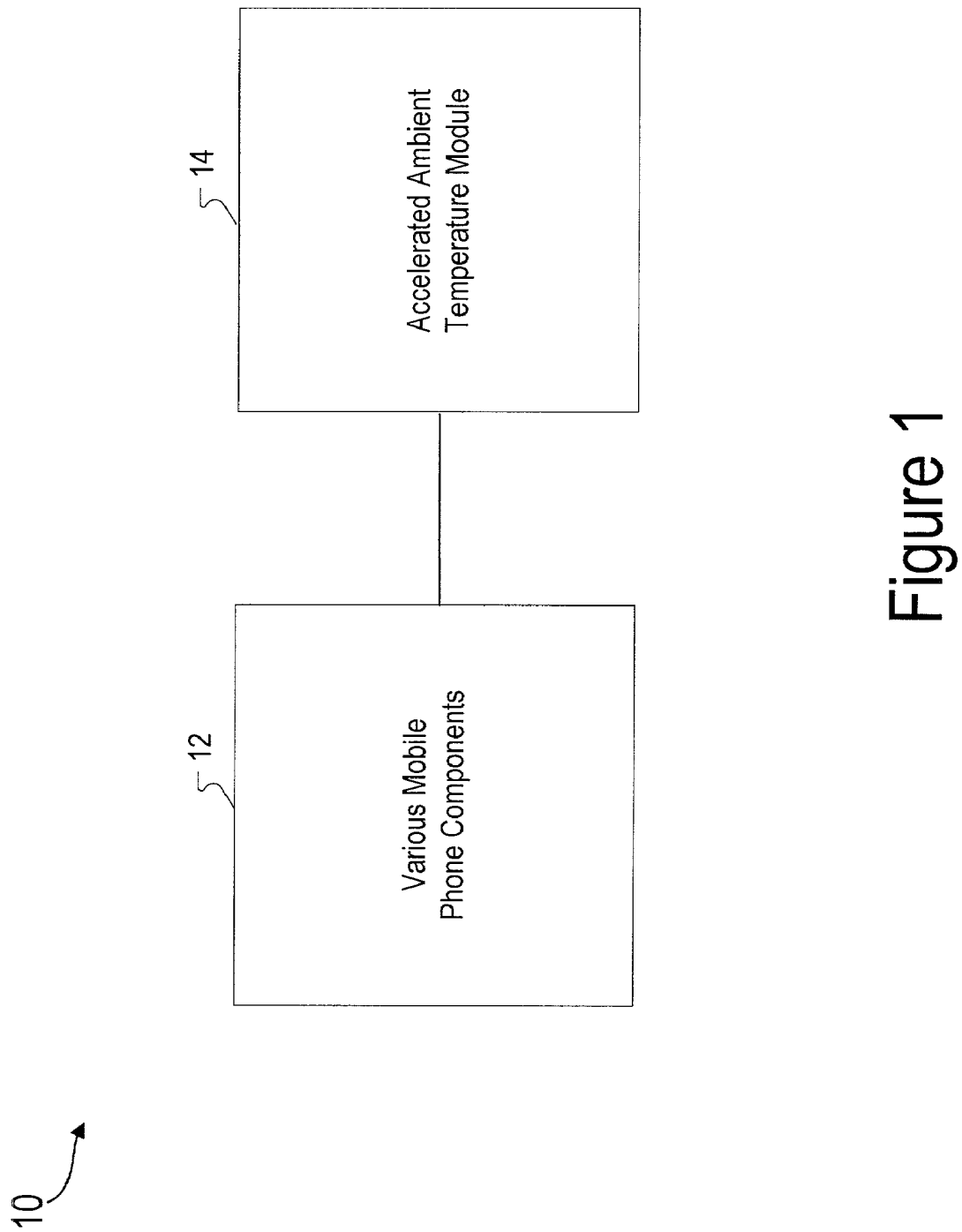
FIG. 1 is a diagram of the basic elements of user equipment that forms the features of the subject matter of the present invention.

FIG. 1: The Basic Invention

FIG. 1 shows user equipment generally indicated as 10 having various mobile phone components 12 in combination with an accelerated ambient temperature measurement module 14. The accelerated ambient temperature measurement module 14 measures the ambient temperature of the environment surrounding the mobile phone 10 based on the temperature of at least one point in the mobile phone 10. The at least one point may include one or more points in relation to one or more of the various mobile phone components 12 of the mobile phone 10.

Consistent with that discussed below, the various mobile phone components 12 may include either a mobile phone housing or battery, and may also include other types of mobile phone components.

Figure 2:
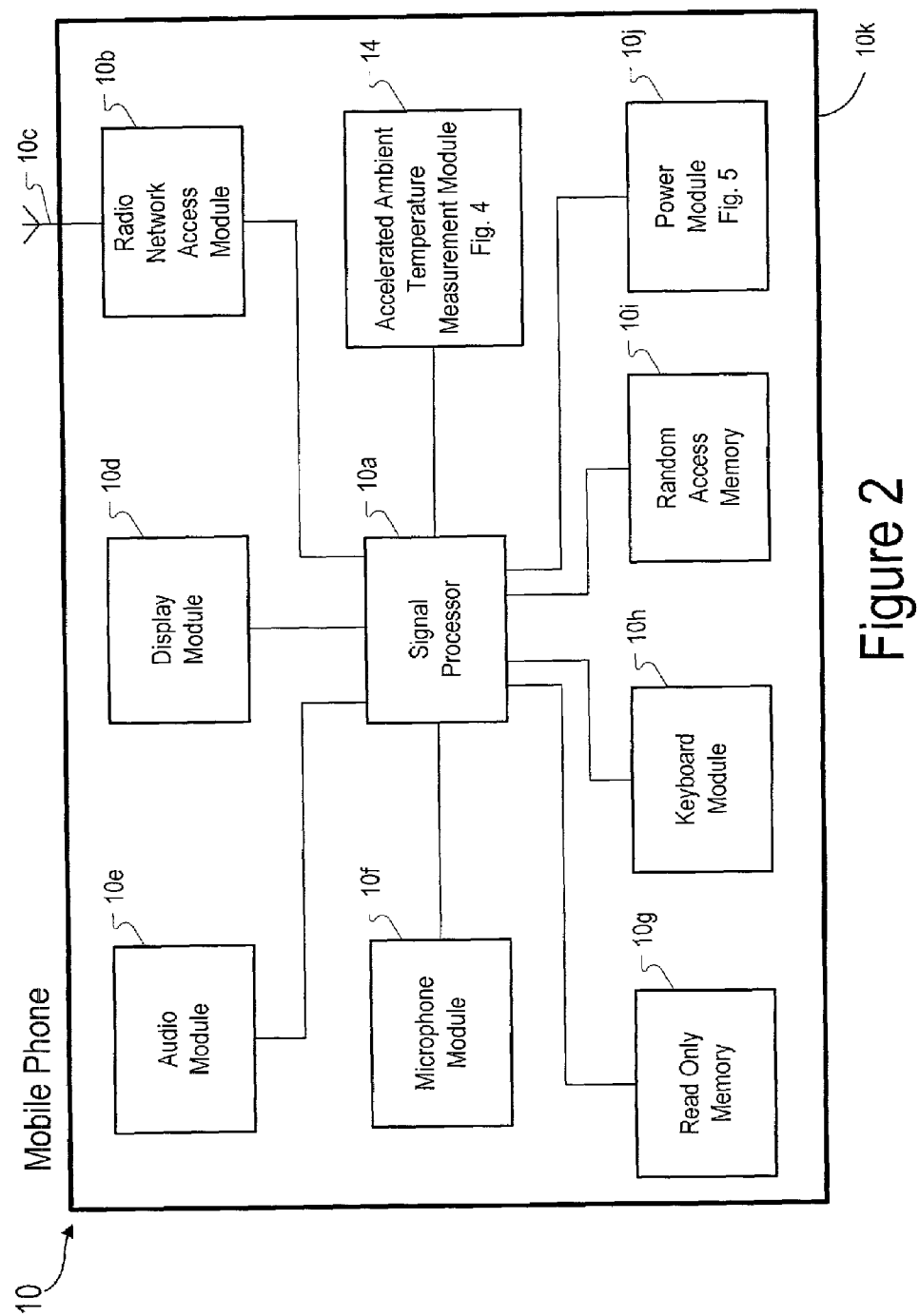
FIG. 2 is a detailed diagram of the user equipment in FIG. 1 in the form of a mobile phone having the features of the present invention.

FIG. 2: The Mobile Phone 10

FIG. 2 shows in more detail the user equipment 10 in the form of a mobile phone 10. The scope of the invention is also intended to cover other types of user equipment and mobile electronic devices, such as a laptop or portable computer.

The mobile phone 10 includes a signal processor 10a connected to a radio access network module 10b (connected to an antenna 10c), a display module 10d, an audio module 10e, a microphone 10f, a read only memory 10g (ROM or EPROM), a keyboard module 10h and a random access memory 10i (RAM). The signal processor 10a controls the operation of mobile phone 10, the operation of which is known in the art. Moreover, the scope of the invention is not intended to be limited to any particular kind or type of the aforementioned elements 10a, 10b, . . . , 10i. For example, the scope of the invention is intended to include the radio access network module 10b being either an antenna module, a radio frequency (RF) module, a radio modem or the like. The user equipment 10 may also include many other circuit elements known in the art which are not shown or described herein.

The signal processor 10a is also connected to a power module 10j and an accelerated ambient temperature measurement module 14. As shown, the aforementioned elements 10a, 10b, . . . , 10j and 14 are all contained in a mobile phone housing generally indicated as 10k. The whole thrust of the invention relates to the operation of the accelerated ambient temperature measurement module 14 in relation to measurements provided from either the power module 10j or the mobile phone housing 10k, as discussed in more detail below.

Figure 3:
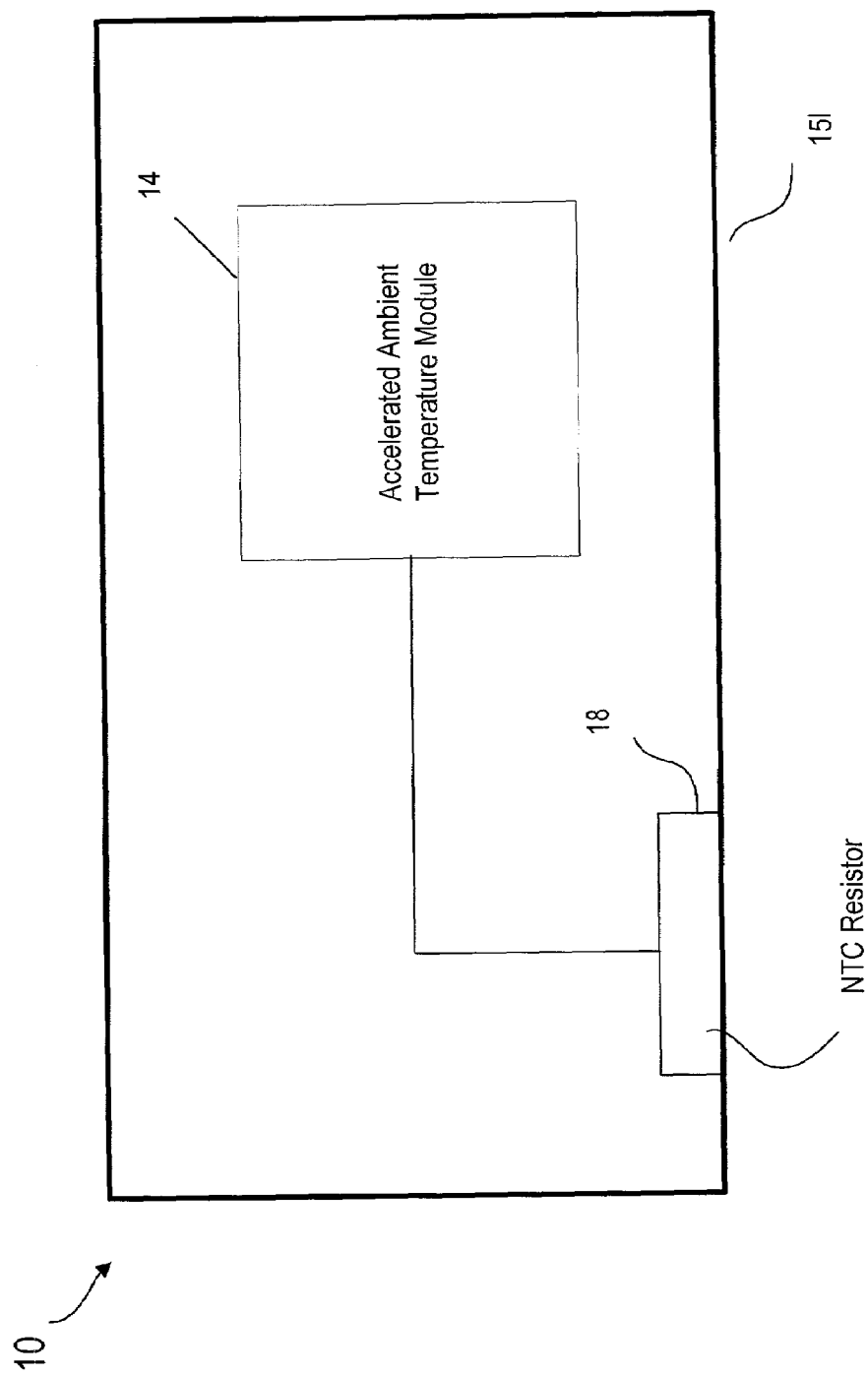
FIG. 3 is a diagram of one embodiment of a mobile phone shown in FIG. 2 that forms that basis for the present invention.
Figure 4:
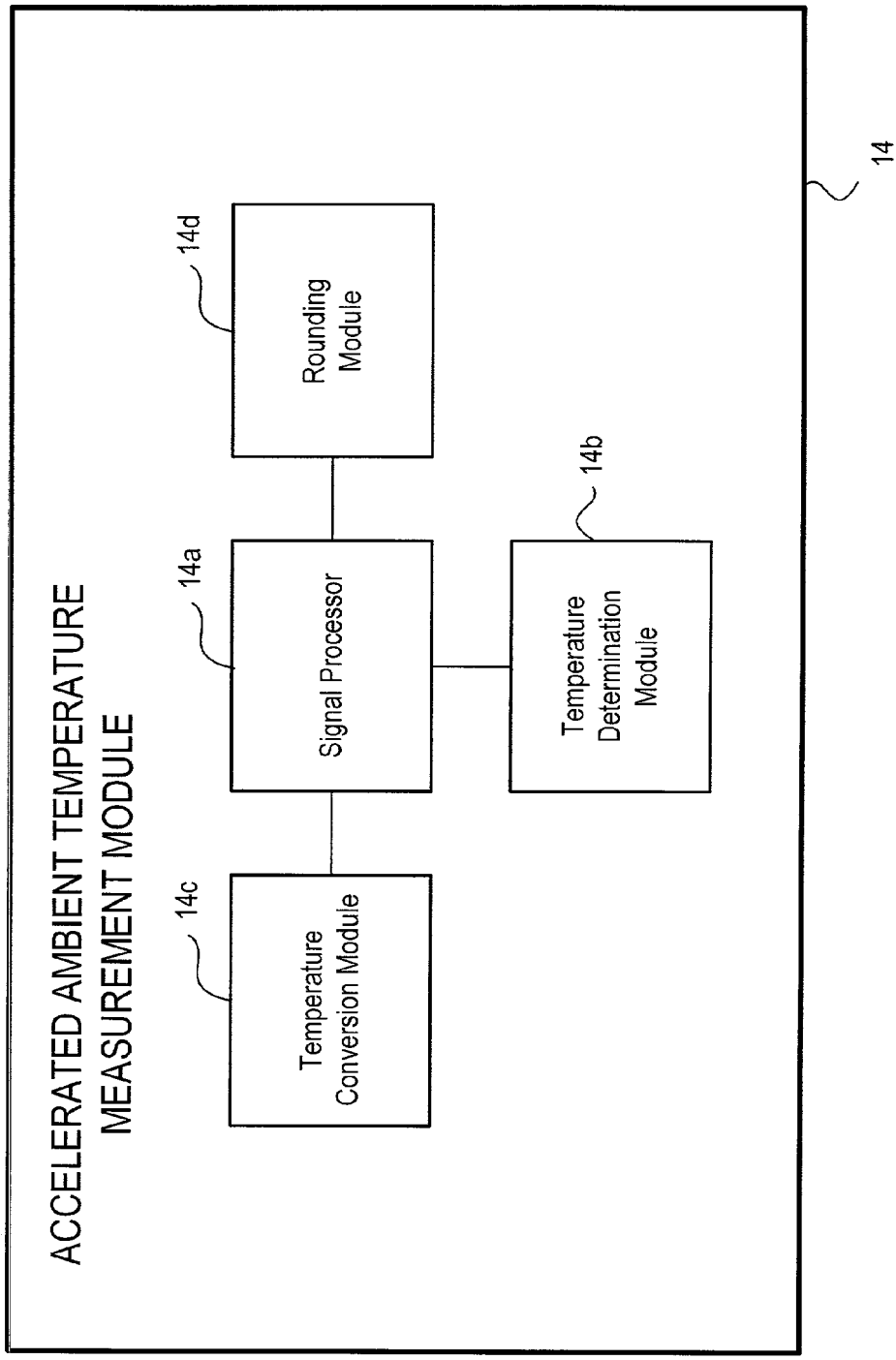
FIG. 4 is a detailed diagram of an accelerated ambient temperature measurement module shown in FIG. 2.

FIGS. 3 and 4: The Mobile Phone Housing Embodiment

FIG. 3 shows one embodiment of the invention, in which the accelerated ambient temperature measurement module 14 measures the ambient temperature of the environment surrounding the mobile phone 10 based on the temperature of the mobile phone housing 10k.

In FIG. 3, the mobile phone 10 has an electrical component 18 arranged in relation to the mobile phone housing 10k. As shown, the electrical component 18 is a negative thermal coefficient (NTC) resistor 18 that is, for example, either structurally embedded into the mobile phone housing 10k or placed on or in close proximity to the mobile phone housing 10k. Although the present invention is described in relation to using the NTC resistor 12, the scope of the invention is intended to include other types of electrical components that have one or more parameters that change with a change in temperature, such as a capacitor, inductor, as well as silicon based components such as a diode, transistor, etc. (The scope of the invention is also intended to include using a sensor inside the mobile phone connect by a wire thereto.) The NTC resistor 18 would be coupled to a power source such as the battery 20 in the power module 10j (see FIG. 5).

FIG. 4 shows the accelerated ambient temperature measurement module 14 having a signal processor 14a and a temperature determination module 14b. In operation, the temperature determination module 14b determines the ambient temperature based on an equation:

$$R_2 = R_1 \exp\left(B\left(\frac{1}{T_2} - \frac{1}{T_1}\right)\right),$$

where $R_1$ is the resistance at temperature $T_1$, $R_2$ is the resistance at temperature $T_2$ and B is a resistor constant, for example, a B-value.

When the current I flows through the NTC resistor 18, the power dissipation P is calculated with the equation:

$$P = I^2 R.$$

The heat transferred from the NTC resistor 18 to the surrounding air by convection is calculated with the equation:

$$\phi = hA(T_{air} - T_r),$$

where h is the heat transfer coefficient, A is the area of the NTC resistor 18, $T_{air}$ is the temperature of the surrounding air, and $T_r$ is the temperature of the NTC resistor 18. Assuming that the NTC resistor 18 is sufficiently thermally insulated from the mobile phone housing 10k then $P=\phi$. With the relationships presented above, the heat transfer coefficient h can be determined which is a measure of the cooling effect of air flow and thus air velocity. The determination of the air velocity measurement has not being implemented before in a mobile phone, which provides means to measure the cooling effect and velocity of wind.

The separate NTC resistor 18 on the mobile phone housing 10k gives a fast response and a very accurate reading of environment temperature than an internal sensor, such as the embodiment discussed below in relation to FIG. 5, because the internal sensor follows the phone's interior temperatures which takes over one half of an hour to stabilize.

A good position for the NTC resistor 18 to be arranged may be near the bottom connector or integrated or embedded into it because there the electrical connection to the NTC resistor 18 would not cause much extra modification to known housing designs.

The Temperature Determination Module 14b

The temperature determination module 14b may be implemented using hardware, software, or a combination thereof. In a typical software implementation, the temperature determination module 14b would be a microprocessor-based architecture having a microprocessor, a random access memory (RAM), a read only memory (ROM), input/output devices and control, data and address buses connecting the same. A person skilled in the art of programming would be able to program such a microprocessor-based implementation to perform the functionality described herein without undue experimentation.

Figure 5:
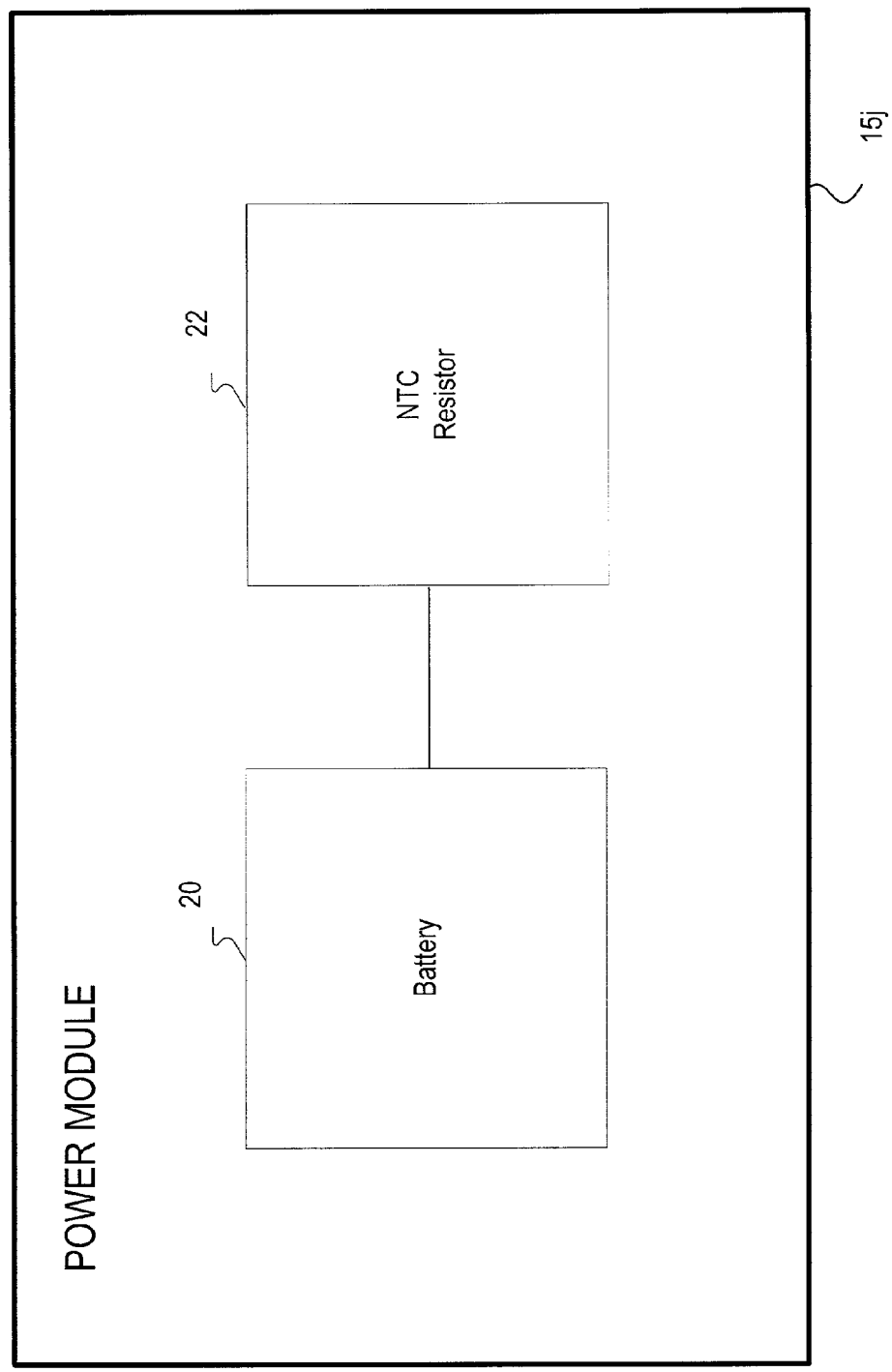
FIG. 5 is a detailed diagram of a power module shown in FIG. 2 that forms the basis for another embodiment of the present invention.

FIG. 5: The Battery Embodiment

FIG. 5 shows an alternative embodiment of the invention, in which the power module 10j has a battery 20 and an electrical component in the form of an NTC resistor 22. In this embodiment, the accelerated ambient temperature measurement module 14 measures the ambient temperature of the environment surrounding the mobile phone 10 based on the temperature of the battery 20.

The NTC resistor 22 is arranged in relation to the battery 20 in close proximity thereto. The scope of the invention is not intended to be limited to any particular arrangement between these two elements.

The temperature measurement module 14 (FIG. 4) can determine the ambient temperature based on an equation:

$$T=(T_1-T_0(e^{-1/\tau}))/(1-e^{-1/\tau}),$$

where T is the accelerated ambient temperature measurement, $T_1$ is the temperature of the battery at a time t, $T_0$ is the temperature of the battery at t=0 seconds, and $\tau$ is a time constant that describes the cooling rate of the mobile phone.

As discussed above, the mobile phone temperature is usually higher than ambient air temperature after a call or when it has been in the user's pocket. To view the right ambient temperature the mobile phone would have to be in stable condition for about an hour. For the typical user, an hour is far too long a time to wait for the right ambient temperature. With the accelerating formula, the thermometer shows the right ambient temperature earlier, i.e. in less than half of the time.

The Equations

The aforementioned equations provided herein are provided by way of example. The scope of the invention is not intended to be limited to any particular or specific set of equations. Embodiments are envisioned by the inventors using other sets of equations that are known in the art and within the scope and spirit of the invention described herein.

Time Series vs. Spatial Temperature Measurements

The acceleration measurement techniques described above require monitoring a time series of temperature readings. However, the scope of the invention is not intended to be limited to only time series temperature monitoring. For example, embodiments are envisioned by the inventors in which temperatures may be monitored in one or more spatial locations in the mobile phone and used to determine the ambient temperature of the environment surrounding the mobile phone. Equations to determine the ambient temperature of the surrounding environment based on such spatial temperature measurements are known in the art, and a person skilled in the art would appreciate how to determine the ambient temperature using the same. The scope of the invention is not intended to be limited to any particular or specific set of such equations.

Other Features

The present invention includes other important features that may be incorporated into either embodiment discussed above.

For example, the display module 10d (FIG. 2) may show on a display (not shown) the accelerated ambient temperature measurement in Celsius or Fahrenheit degrees, and/or the audio module 10e (FIG. 2) may generate an audio signal containing the accelerated ambient temperature measurement. The display may have a menu with a menu selection for displaying the accelerated ambient temperature measurement.

In FIG. 3, the accelerated ambient temperature measurement module 14 may also have a temperature conversion module 14c and a rounding module 14d. The temperature conversion module 14c converts the accelerated ambient temperature measurement either from Celsius to Fahrenheit degrees or from Fahrenheit to Celsius degrees. The rounding module 14d rounds the accelerated ambient temperature measurement to a nearest whole number.

Similar to that discussed above, the temperature conversion module 14c and rounding module 14d may be implemented using hardware, software, or a combination thereof. In a typical software implementation, the temperature conversion module 14c and rounding module 14d would be a microprocessor-based architecture having a microprocessor, a random access memory (RAM), a read only memory (ROM), input/output devices and control, data and address buses connecting the same. A person skilled in the art of programming would be able to program such a microprocessor-based implementation to perform the functionality described herein without undue experimentation.

Scope of the Invention

The scope of the invention is also intended to include arranging any one or more of the aforementioned electrical components in relation to other types of mobile phone components.

Accordingly, the invention comprises the features of construction, combination of elements, and arrangement of parts which will be exemplified in the construction hereinafter set forth.

It will thus be seen that the objects set forth above, and those made apparent from the preceding description, are efficiently attained and, since certain changes may be made in the above construction without departing from the scope of the invention, it is intended that all matter contained in the above description or shown in the accompanying drawing shall be interpreted as illustrative and not in a limiting sense.

We claim:

1. User equipment having components, including a housing and a battery, characterized in that the user equipment comprises an accelerated ambient temperature measurement module for measuring the ambient temperature of the environment surrounding the user equipment based on a relationship defined by a change in the temperature of at least one point in the user equipment at least at two different instances of time, a measurement of an electrical component parameter at one of the instances in time, as well as a known constant of the electrical component parameter.

2. User equipment according to claim 1, characterized in that the at least one point includes one or more points in relation to one or more components of the user equipment.

3. User equipment according to claim 2, characterized in that the one or more components include a housing having an electrical component arranged in relation thereto.

4. User equipment according to claim 3, characterized in that the electrical component is a resistor; and the accelerated ambient temperature measurement module has a temperature determination module that determines the ambient temperature based on an equation:

$$R_2 = R_1 \exp\left(B\left(\frac{1}{T_2} - \frac{1}{T_1}\right)\right),$$

where $R_1$ is the resistance at temperature $T_1$, $R_2$ is the resistance at temperature $T_2$ and B is a resistor constant, for example, a B-value.

5. User equipment according to claim 4, characterized in that the temperature determination module determines a heat transfer coefficient h which is a measure of the cooling effect of air flow and thus air velocity using the equation:

$$h = \frac{\phi}{A(T_{air} - T_r)},$$

where A is the area of the resistor, $T_{air}$ is the temperature of the surrounding air and $T_r$ is the temperature of the resistor.

6. User equipment according to claim 1, characterized in that the one or more components include a battery.

7. User equipment according to claim 6, characterized in that the user equipment has an electrical component arranged in relation to the battery.

8. User equipment according to claim 7, characterized in that the electrical component is a resistor; and
the accelerated ambient temperature measurement module has a temperature determination module that determines the ambient temperature based on an equation:

$$T=(T_1-T_0(e^{-t/\tau}))/(1-e^{-t/\tau}),$$

where T is the accelerated ambient temperature measurement, $T_1$ is the temperature of the battery at a time t, $T_0$ is the temperature of the battery at t=0 seconds, and $\tau$ is a time constant that describes the cooling rate of the user equipment.

9. User equipment according to claim 1, characterized in that the user equipment comprises a display for showing the accelerated ambient temperature measurement in Celsius or Fahrenheit degrees.

10. User equipment according to claim 1, characterized in that the user equipment comprises a display having a menu with a menu selection for displaying the accelerated ambient temperature measurement.

11. User equipment according to claim 1, characterized in that the user equipment comprises an audio module for generating an audio signal containing the accelerated ambient temperature measurement in Celsius or Fahrenheit degrees.

12. User equipment according to claim 1, characterized in that the accelerated ambient temperature measurement module comprises a temperature conversion module for converting an accelerated ambient temperature measurement either from Celsius to Fahrenheit degrees or from Fahrenheit to Celsius degrees.

13. User equipment according to claim 1, characterized in that the accelerated ambient temperature measurement module comprises a rounding module for rounding an accelerated ambient temperature measurement to a nearest whole number.

14. A method for providing an ambient temperature of the environment surrounding user equipment, such as a mobile phone, having components including a housing and a battery, comprising the step of: measuring the temperature of at least one point in the user equipment; and measuring the ambient temperature of the environment surrounding the user equipment based on a relationship defined by a change in the temperature of the at least one point at least at two different instances of time, a measurement of an electrical component parameter at one of the instances in time, in addition to a known constant of the electrical component parameter.

15. A method according to claim 14, characterized in that the step of measuring the temperature of the at least one point includes measuring one or more points in relation to one or more components of the user equipment.

16. A method according to claim 15, characterized in that the one or more components include a housing; and the method includes the step of arranging an electrical component in relation to the housing.

17. A method according to claim 16, characterized in that
the step of arranging includes arranging a resistor in relation to the housing; and
the step of measuring the ambient temperature includes using an equation:

$$R_2 = R_1 \exp\left(B\left(\frac{1}{T_2} - \frac{1}{T_1}\right)\right),$$

where $R_1$ is the resistance at temperature $T_1$, $R_2$ is the resistance at temperature $T_2$ and B is a resistor constant e.g B-value.

18. A method according to claim 17, characterized in that the method comprises the steps of determining a heat transfer coefficient h which is a measure of the cooling effect of air flow and thus air velocity using the equation:

$$h = \frac{\phi}{A(T_{air} - T_r)},$$

where A is the area of the resistor, $T_{air}$ is the temperature of the surrounding air and $T_r$ is the temperature of the resistor.

19. A method according to claim 15, characterized in that the at least one component includes a battery.

20. A method according to claim 19, characterized in that the method includes the step of arranging an electrical component in relation to the battery.

21. A method according to claim 20, characterized in that
the step of arranging includes arranging a resistor in relation to the battery; and
the step of measuring the ambient temperature includes using an equation:

$$T=(T_1-T_0(e^{-t/\tau}))/(1-e^{-t/\tau}),$$

where T is the accelerated ambient temperature measurement, $T_1$ is the temperature of the battery at a time t, $T_0$ is the temperature of the battery at t=0 seconds, and r is a time constant that describes the cooling rate of the user equipment.

22. A method according to claim 14, characterized in that the method comprises the step of displaying the accelerated ambient temperature measurement in Celsius or Fahrenheit degrees.

23. A method according to claim 14, characterized in that the method comprises the step of displaying a menu with a menu selection for providing the accelerated ambient temperature measurement.

24. A method according to claim 14, characterized in that the method comprises the step of generating an audio signal containing the accelerated ambient temperature measurement in Celsius or Fahrenheit degrees.

25. A method according to claim 14, characterized in that the method comprises the step of converting the accelerated ambient temperature measurement either from Celsius to Fahrenheit degrees or from Fahrenheit to Celsius degrees.

26. A method according to claim 14, characterized in that the method comprises the step of rounding the accelerated ambient temperature measurement to a nearest whole number.

27. User equipment according to claim 1, wherein the relationship includes determining a factor based on the difference between the inverse of two temperatures in relation to the known constant.

28. User equipment according to claim 27, wherein the relationship includes determining an exponential value of the factor.

29. User equipment according to claim 28, wherein the relationship also includes determining the electrical component at a first instant of time based on a further relationship between the exponential value and the electrical component at a second instant of time.

30. User equipment according to claim 1, wherein the electrical component is either a resistor, a capacitor, an inductor, a diode, a transistor, another suitable electrical component, or some combination thereof.

31. A method according to claim 14, wherein the relationship includes determining a factor based on the difference between the inverse of two temperatures in relation to the known constant.

32. A method according to claim 31, wherein the relationship includes determining an exponential value of the factor.

33. A method according to claim 32, wherein the relationship also includes determining the electrical component at a first instant of time based on a further relationship between the exponential value and the electrical component at a second instant of time.

34. A method according to claim 14, wherein the electrical component is either a resistor, a capacitor, an inductor, a diode, a transistor, another suitable electrical component, or some combination thereof.

* * * * *

UNITED STATES PATENT AND TRADEMARK OFFICE
CERTIFICATE OF CORRECTION

PATENT NO.        : 7,027,834 B2                                          Page 1 of 1
APPLICATION NO. : 10/091181
DATED             : April 11, 2006
INVENTOR(S)       : Sakari Soini et al.

It is certified that error appears in the above-identified patent and that said Letters Patent is hereby corrected as shown below:

In Column 6, line 42, claim 1, line 9, "as well as" should be -- in addition to --

Signed and Sealed this

Eighteenth Day of September, 2007

JON W. DUDAS
*Director of the United States Patent and Trademark Office*